Figure 1:
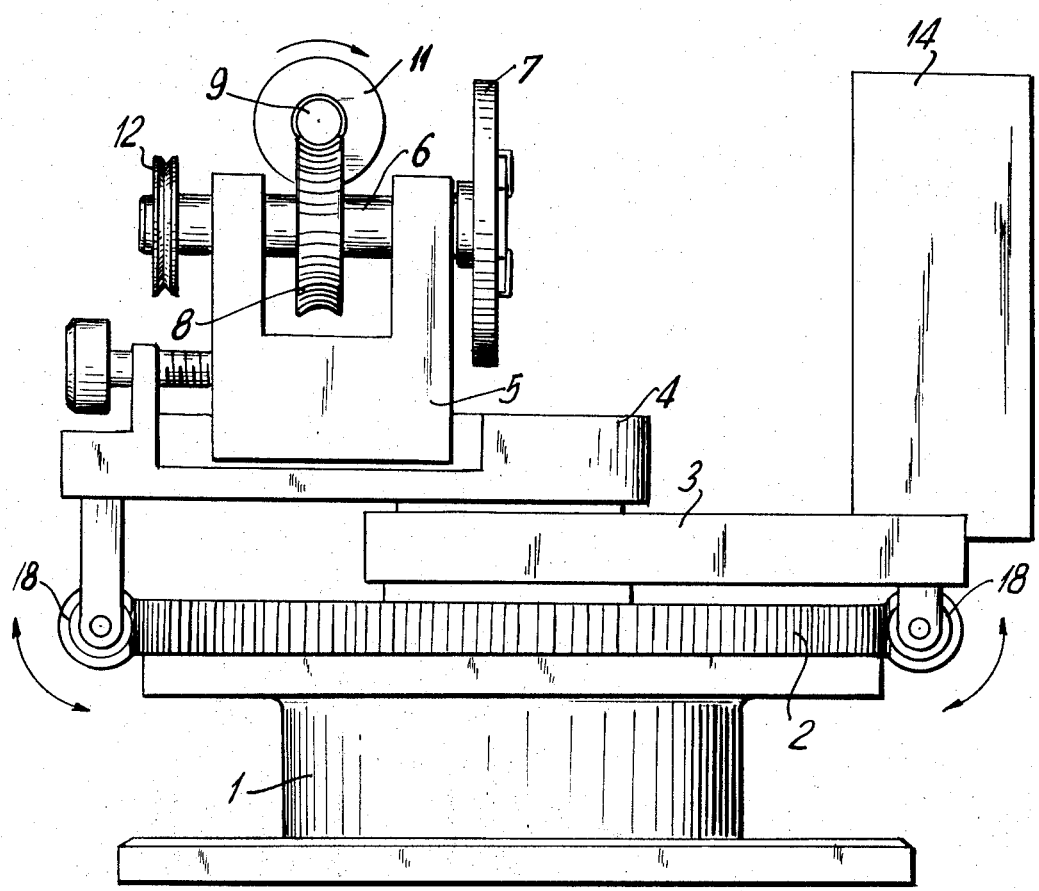

United States Patent [19]
Mérigoux et al.

[11] 3,870,880

[45] Mar. 11, 1975

[54] PROCESS AND DEVICE FOR STUDYING THE STRUCTURE OF SINGLE CRYSTALS

[75] Inventors: Henri Mérigoux; Jean-Francois Darces, both of Besancon; Jean-Yves Exertier, Valence, all of France

[73] Assignee: Henri Merigoux, Besangon, France

[22] Filed: Oct. 9, 1973

[21] Appl. No.: 404,247

[30] Foreign Application Priority Data
Oct. 11, 1972 Switzerland...................... 14809/72

[52] U.S. Cl............................... 250/273, 250/277
[51] Int. Cl............................................ G01t 23/20
[58] Field of Search ........... 250/272, 273, 274, 277, 250/278, 279

[56] References Cited
UNITED STATES PATENTS

| | | | |
|---|---|---|---|
| 2,619,600 | 11/1952 | Hamacher.......................... | 250/273 |
| 2,798,957 | 7/1957 | Holden et al. ..................... | 250/273 |
| 2,819,405 | 1/1958 | Bond................................. | 250/274 |
| 3,448,265 | 6/1969 | Samuelson........................ | 250/273 |

Primary Examiner—James W. Lawrence
Assistant Examiner—Davis L. Willis
Attorney, Agent, or Firm—Heilman, Heilman & Casella

[57] ABSTRACT

A method and apparatus for studying the structure of a single crystal by the detection of X-ray reflections from said crystal operates in a manner such that the sample crystal is first positioned on a rotatable support having means for indicating its angular position and means for driving it at either one of two speeds of rotation, i.e., one rapid and one slow. The crystal support is rotated at its fast speed of rotation while sweeping the angular field of irradiation of the X-rays to obtain reflections. The rotatable support is then replaced at one of the positions where a reflection was observed during the fast rotation and such rotatable support is then rotated at its slow speed of rotation until a reflection occurs again. Means are provided for reading the angular position of the rotatable support, and from those angular positions determining the structure of the crystal.

11 Claims, 2 Drawing Figures

PROCESS AND DEVICE FOR STUDYING THE STRUCTURE OF SINGLE CRISTALS

The invention concerns the angular measurement of single crystals by means of instruments of the X-ray goniometer type.

It enables the complete determination of the orientation of a cut sample from a single crystal.

The invention can be used for laboratory measurements or for industrial manufacturing control.

To study the orientation of a single crystal sample, certain forms of goniometer are known, but the crystals which can be dealt with by these devices are necessarily small, only of the order of several mm cube maximum.

To enable large single crystals to be dealt with, special devices have been proposed. In the case of a sample limited by two plane parallel faces the following data can be determined.

a. either an angle which is normal to these plane faces, with one line of the angle defined by the crystal;

b. or the angles which form the normal to these plane faces with respect to a datum line defined by the crystal.

The absolute position of the sample is defined about more or less one revolution of the sample around a normal to its plane face.

Certain devices even necessitate the use of a standard crystal with which the sample to be measured is compared.

Finally in known devices used, the movements of the several parts of the apparatus are either effected manually, or by a single motor for the movements called $\Theta$ and $2\Theta$. This involves a complex mechanical system to connect or disconnect these movements.

The present invention enables the angular position in space of a single-crystalline sample which is in the form of a plate or lamella or any other geometric configuration, to be easily and accurately measured.

This position in space is defined in terms of the orientation of two directions of the sample.

Each of these two directions is defined by the three angles which it forms with any three base axes representing the space; often, the base axes are also the axes defining the crystalline substance.

As reference directions of the sample, the geometric normal to the principal face of the sample plate, and any direction defined in the place of the plate, are normally used. Usually this second direction is that of one of the sides of the plate.

With the present invention, all the particulars are obtained in a single step without having to alter the position of the sample on its support.

The invention enables measurements to be made on single crystalline samples of any dimensions, whatever the crystalline system might be.

The invention is even usable where the sample is already mounted on a mechanical assembly possessing a reference plane; the orientation of the sample is then given with respect to this reference plane.

The invention can be fitted on an ordinary goniometer, which can be used to effect all the usual measures of X-ray-crystallography.

Figure 2:
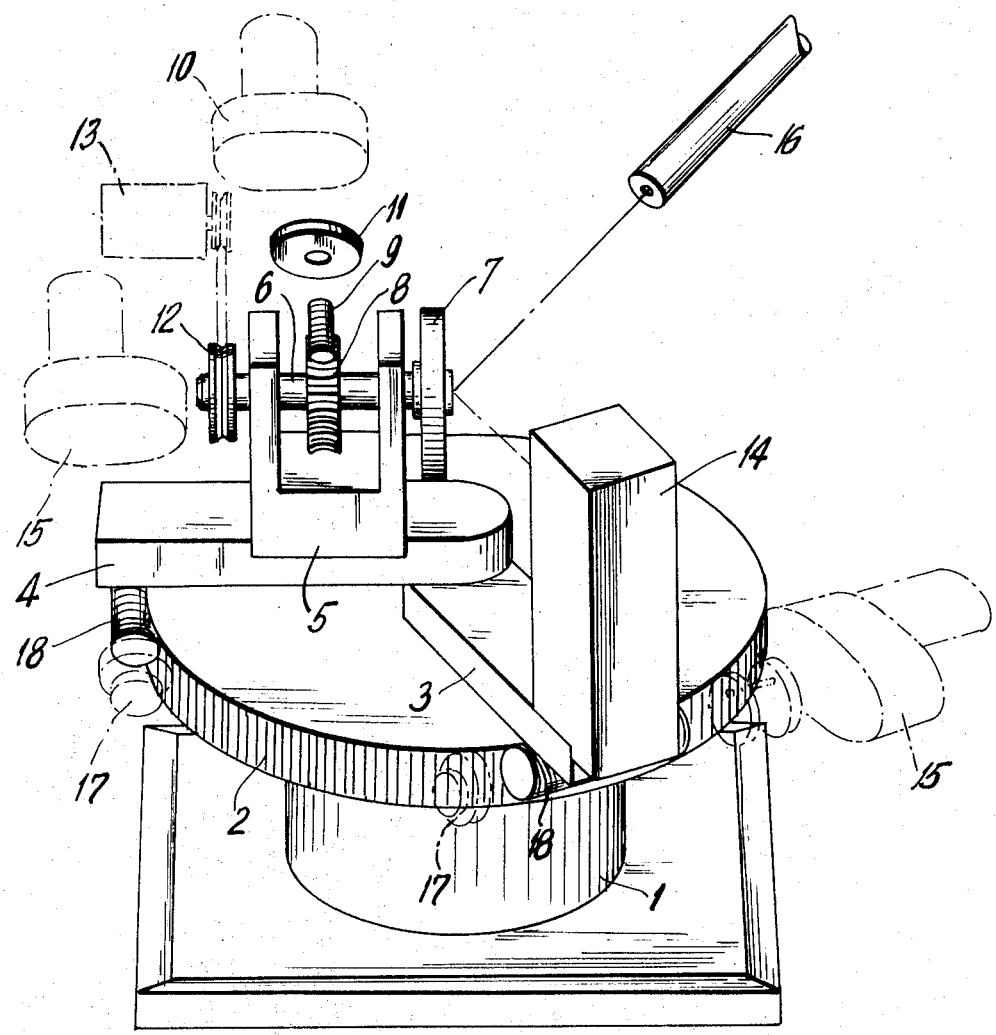

The accompanying drawings represent one embodiment of the invention. In the drawings, FIG. 1 is a side view of an apparatus, and FIG. 2 is a view thereof in perspective.

The apparatus shown in the drawings comprises a. A base fixed on a pedestal 1.

b. A helicoidally toothed worm wheel fixed firmly on the base 1.

c. A detector carrying arm 3 rotatable around the axis of the base 1 on which arm is mounted a reflection detector 14.

d. A sample carrier 4 also rotatable around the axis of the base 1.

e. A movable carriage 5 fixed on the sample carrier 4. It includes a spindle 6, a sample carrier plate 7, a worm wheel 8, and a pulley 12 for rapid rotation of the spindle 6. The movable carriage assembly has a plate 7 carried by spindle 6, on which there is a sample. The sample is fixed on the plate 7 by any appropriate or known means such as an adhesive. The plate 7 can be rotated at two speeds, one rapid, the other slow. The slow speed of rotation is effected by rotating the worm wheel 8 by a worm 9 connected to a step-by-step motor 10. The rapid speed of rotation is obtained by disconnecting the worm 8 from the worm wheel, and rotating spindle 6 by the pulley 12, driven by motor 13. A catch 11 is provided on the worm 9 to disconnect it from the worm wheel.

It is to be noted that the assembly of the movable carriage can be fitted to any goniometer which possesses $\Theta$ and $2\Theta$ drives. All that is necessary is to locate the sample carrying arm or its equivalent on the goniometer in question.

f. Means for driving the motors. This comprises a direct current supply for the motor 13 effecting rapid rotation, a generator of variable frequency impulses for the step-by-step motors 15 moving the arms 3 and 4, and the step-by-step motor 10 for rotating worm 9. The motors may be run in either direction, separately or together. It is also possible to disconnect the motors from the parts which they move. When the movable carriage is fitted on an existing goniometer, the supply means described remain usable except that motor 15 is disconnected.

g. An indicating device. The device must show the angular positions of the carriage and detector around their axes of rotation, i.e. the axis of the base 1 for the movement of the arms 3 and 4, and the axis of the spindle 6 indicating rotation of the sample-carrying plate 7. The display is controlled by means of two electromechanical transducers, one representing the position of arm 3 and one of arm 4, by drives from the worms 18, and another on the plate assembly for the degree of rotation of the sample carrying plate 7. The display may alternatively be controlled directly by impluses sent to the step-by-step motors. When the movable carriage is fitted on an existing goniometer, the display device indicates only the movement of the plate 7.

h. Zero position references for each movable part, the arms 3 and 4 and the plate 7.

i. The sample carrying plate holds the sample by any appropriate or known means. It is interchangeable so that one plate may be provided for each type of fixing means used.

j. The sample carrier 7 may include means for linearly moving the sample. This movement may be in a single (x) direction, or in two directions (x, y) at right angles. The movements may be effected either when the plate is stationary, or when it is moving, if provided with suitable couplings at the axis of rotation of the plate.

k. An X-ray rource 16.

The laws of reflection of X-rays by crystal planes show that there are only very few angles of incidence favourable to reflection, and that the angular field of these reflections is very narrow. Because of these properties, observation of these planes of reflection enable the orientation of a crystal structure with respect to the geometric form of the sample to be deduced with the assistance of appropriate geometric logic. The method of the invention enables sufficient reflections to be determined in a short time.

After having chosen an angle of reflection, a search is made to enable the sample to be placed in a position favourable for this observation.

The front face of the sample is placed on the axis of the base 1 by means of translatory movements of the assembly of the movable carriage 5.

Then the plate 7 is rapidly rotated about its axis, and also by means of the arm 4 about the axis of worm wheel 2.

If a reflection takes place, it must be visible at a certain position of the sample carrier arm 4.

When a reflection occurs it is visible at least twice during a rotation of arm 4. The difference between the angular positions corresponding to the two observations is noted, though the information derivable from the two observed angles only provides knowledge of the orientation of the geometric normal of the plate sample or of the tangent plane of the sample at the point of impact of the X-rays.

Because of the redundancy of this information it is possible to use incomplete measures, not exactly conforming to the process; it is sufficient to make a number of observations in excess of the theoretical number necessary. Treatment of the results in certain cases furnishes the required direction.

If with a given sample it has been possible to observe three positions of reflection, then as many new angles of reflection as are necessary, are taken.

It now remains to determine the orientation of another direction of the sample.

The sample carrier arm 4 is replaced at a position of reflection determined when the plate was rotated rapidly. Slow rotation of the plate about its axis is now substituted for the rapid movement.

The plate is rotated until a reflection is found again.

The position of the sample carrier plate is now read. The zero of this angular position corresponds to the position for which the side of the plate, if taken as a reference, is horizontal. This numerical value is noted.

It is possible to alter the order in which the measures are taken, in particular those relative to the determination of the orientation of the normal to the plate and to those relative to a direction of a plane of the plate.

It is also possible to use incomplete information if more readings are taken than are necessary.

In known devices the orientation of a crystal is known with respect to rotation around a direction fixed with respect to the crystal. In the present device, from the two orientation readings, the complete orientation of the sample in space is determined.

The change from the rapid means of rotation to the slow means reduces the time required to take readings, and permits a wide choice of mathematical solutions for determining the orientation.

Any type crystal at any orientation may be evaluated.

Since a sample may have any geometrical configuration there is a possibility of measuring the orientation of a nonflat or cylindrical sample; in this case the direction of the generatrix can be determined.

There is also the possibility of determining the orientation of several directions in the plane of the sample, this being applicable to samples possessing several directions to be referenced.

The following data may be evaluated from the readings taken.

a. A number representing the difference between angular positions of the arm 4 when the sample carrying plate 7 is rapidly rotated.

b. A number representing the angular position of the plate 7 when the X-ray reflection is found by the slow method of rotation.

These numbers are not directly usable; they must be processed to give the orientation of the sample.

The transformation can be made graphically with a de Wulff grid.

Numerical transformation can also be made with the aid of a computer.

A sample can be a single crystal, but it can also have faults; it may be important to be able to evaluate them. The types of faults that it is proposed to evaluate are those which exist because there are distinct crystalline zones. The origin of such a fault may be connected with twinned crystal zones. It is possible to ascertain the relative disorientation of the zones, and their positions with respect to the sample.

Since the sample can be moved into a plane of the plate passing through its axis of rotation, or independently of the plate, different processes are available.

Process (a).

1. The plate is rapidly rotated to establish reflection of the X-rays by the sample.

2. Sample translation on the plate takes place during rotation of the plate.

In this latter condition the sample is displaced slowly along a single radial direction (movement with respect to the plate). If the crystal is a good crystal its reflection remains stationary. If the crystal possesses a disorientated zone, when this zone arrives at the axis of the turning plate its reflection is lost.

3. The translation of the plate is stopped and the orientation of the new zone determined by the process already described.

4. The translation is re-coupled to rotation, and the sample continues its linear displacement. The reflection is held, as long as it is derived from the zone. When the reflection is again lost the process is repeated from step 3.

For each zone it is necessary to note all the observed values to know the complete orientation of each zone.

Process (b)

1. A reflection is found during rapid rotation, and then with slow rotation. When a reflection is obtained the rotational movement is stopped.

2. The crystal is now moved in the plane of the plate. If the crystal is a good one (i.e. homogeneous) its reflection is maintained. If the crystal possesses a disorientated zone, when this zone arrives at the centre of the plate, the reflection is lost.

3. The translation movement is stopped and the orientation of the new zone is determined by the process already described. When reflection is obtained the movement of rotation is stopped and the process is returned to step No. 2.

It is necessary, for each zone, to note all the values required for evaluating the complete orientation of each zone.

For the two processes (a) and (b) one or two translation movements are available; the sample carrier can possess a single type of translation in say the "x" direction, but two perpendicular translations in the "x" and "y" directions may be used.

Under these conditions, instead of a linear observation, any observation on the surface of the sample can be effected.

Advantages of the process of the invention.

The relative orientation of different zones can be determined without it being necessary to know their orientation with respect to the geometric form of the sample.

It is only necessary for the sample to present a plane face, the sample being held by a mechanical system such that this plane face is parallel to the plane of the plate.

The process can be used in two distinct manners.
a. Study of an object of which orientation is not known.
b. Study of an object of which the orientation is known or presumed.

In the first case the process described referring to the orientation is applied.

In the second case the positions in which a reflection is observed are determined in advance. The angle between the observed positions and the positions calculated, enable the orientation to be evaluated.

These two conditions can be encountered in crystalography laboratories and in all industrial problems concerned with crystals, for example, controlling and operating sawing, forming synthetic crystals, control of resonators, control of electronic constituents, sawing of single crysals and so on.

The process can also be used to study synthetic single crystals such as synthetic hydro-thermals or varnish.

Finally the method can be used to evaluate the structure of a synthetic crystal before cutting it into plates.

What I claim is:

1. A method for the control of single crystals by the detection of the reflections of X-rays irradiating said single crystals, comprising the steps of:
   a. positioning a specimen crystal on a rotatable support;
   b. rotating said support about its own axis at a fast speed of rotation and simultaneously sweeping with said rotatable support at least a part of the angular field of irradiation of the X-rays to obtain reflections;
   c. determining the orientation of a direction of the specimen from the angles of said reflections;
   d. replacing said rotatable support at one of the positions of reflection derived from said fast rotation of the rotatable support;
   e. rotating said rotatable support about its own axis at a low speed of rotation until the said reflection occurs again;
   f. reading the angular position of said rotatable support; and
   g. determining therefrom the orientation of another direction of the specimen.

2. A method according to claim 1, wherein the specimen is submitted to at least one translational movement in the plane of the rotatable support to detect a disoriented zone in said specimen by loss of reflection.

3. A method according to claim 2, wherein said translational movement is coupled to said rotational movement of the support, said translational movement being made during the fast rotation of the support.

4. A method according to claim 2, wherein said translational movement is independent from the rotational movement of the support, said translational movement being made after stopping of the low speed rotation of said support.

5. A device for the control of single crystals by the detection of the reflections of X-rays, comprising;
   a. a movable carriage;
   b. a specimen-carrying support rotatably mounted on said movable carriage, said support capable of two speeds of rotation, one fast and the other slot;
   c. means for controlling the rotational displacement of said specimen-carrying support;
   d. means for alternatively selecting one of said two speeds of rotation of the specimen-carrying support; and
   e. means for reading the angular position of said specimen-carrying support.

6. A device according to claim 5, wherein the specimen-carrying support is mounted on a shaft rotatably arranged on said movable carriage, said shaft selectively coupled to a driving motor and pulley for rapid rotation or to a step-by-step motor and gear assembly for slow rotation.

7. A device according to claim 6, wherein said motor for rapid rotation is direct current operated, wherein said step-by-step motor for slow rotation is operated by a variable frequency impulse generator, and wherein both motors are reversible.

8. A device according to claim 7, further comprising:
   a. a base carrying a fixed toothed wheel;
   b. a detector carrying arm rotatably mounted on said base, said arm carrying a reflection detector, said arm provided with a gear meshing with said toothed wheel;
   c. a speciman carrying arm rotatably mounted on said base, said specimen carrying arm provided with a gear meshing with said toothed wheel, said specimen carrying arm carrying said movable carriage carrying said specimen carrying support;
   d. a reversible step-by-step motor coupled to said detector carrying arm and a reversible step-by-step motor coupled to said specimen carrying arm, said motors driven from a variable frequency impulse generator; and
   e. means for indicating the angular position of said detector carrying arm and said specimen carrying arm.

9. A device according to claim 5, wherein said specimen carrying support is provided with a means for the translation of the specimen in the plane of said specimen carrying support.

10. A device according to claim 9, wherein said means for the translation of the specimen is independent from the rotation of said specimen carrying support.

11. A device according to claim 9, wherein said means for the translation of the specimen is coupled to the rotation of said specimen carrying support.

* * * * *